(12) United States Patent
Li et al.

(10) Patent No.: US 12,432,684 B2
(45) Date of Patent: Sep. 30, 2025

(54) MEASUREMENT REPORTING METHOD, POSITIONING MEASUREMENT DEVICE, AND LOCATION MANAGEMENT FUNCTION

(71) Applicant: DATANG MOBILE COMMUNICATIONS EQUIPMENT CO., LTD., Beijing (CN)

(72) Inventors: Hui Li, Beijing (CN); Ren Da, Beijing (CN); Haiyang Quan, Beijing (CN); Rongyi Fang, Beijing (CN); Bin Ren, Beijing (CN); Xiaotao Ren, Beijing (CN); Gang Li, Beijing (CN); Jianxiang Li, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 413 days.

(21) Appl. No.: 18/012,231

(22) PCT Filed: Jun. 23, 2021

(86) PCT No.: PCT/CN2021/101785
§ 371 (c)(1),
(2) Date: Dec. 22, 2022

(87) PCT Pub. No.: WO2021/259318
PCT Pub. Date: Dec. 30, 2021

(65) Prior Publication Data
US 2023/0262646 A1    Aug. 17, 2023

(30) Foreign Application Priority Data
Jun. 24, 2020   (CN) .......................... 202010590821.0

(51) Int. Cl.
*H04W 24/10*  (2009.01)
*H04L 5/00*   (2006.01)
*H04W 64/00*  (2009.01)

(52) U.S. Cl.
CPC .......... *H04W 64/00* (2013.01); *H04L 5/0051* (2013.01); *H04W 24/10* (2013.01)

(58) Field of Classification Search
CPC ....... H04W 64/00; H04W 24/10; H04W 4/02; H04W 4/025; H04W 4/026; H04W 4/027;
(Continued)

(56) References Cited

U.S. PATENT DOCUMENTS

2020/0178202 A1   6/2020  Edge et al.
2020/0408871 A1*  12/2020 Da ........................ G01S 5/0072
(Continued)

FOREIGN PATENT DOCUMENTS

CN   101389054 A    3/2009
CN   102763003 A    10/2012
(Continued)

OTHER PUBLICATIONS

CATT, "Discussion of Potential Techniques for NR Positioning", 3GPP TSG RAN WG1 Meeting #94bis, Chengdu, China, Oct. 8-12, 2018, total 12 pages, R1-1810532.
(Continued)

*Primary Examiner* — Chuong A Ngo
(74) *Attorney, Agent, or Firm* — KILPATRICK TOWNSEND & STOCKTON LLP (57) ABSTRACT

Provided are a measurement reporting method, a positioning measurement device, and a location management function (LMF). The method includes receiving a positioning measurement reporting request message sent by a location management function (LMF); and reporting at least one positioning measurement value to the LMF on the basis of
(Continued)

receiving a positioning measurement report request message sent by a location management function — 101 reporting one or more positioning measurement values to the location management function based on the positioning measurement report request message — 102 the positioning measurement reporting request message, and the at least one positioning measurement value includes at least one carrier phase measurement value. By means of the embodiments of the present application, the reporting of a carrier phase measurement value is realized, carrier phase positioning is supported, and the positioning precision is improved.

18 Claims, 4 Drawing Sheets

(58) Field of Classification Search
CPC .. H04W 64/006; H04L 5/0051; G01S 5/0036; G01S 5/02; G01S 5/0205; G01S 5/0236
See application file for complete search history.

(56) References Cited

U.S. PATENT DOCUMENTS

2022/0166656 A1* 5/2022 Cha ................... H04W 64/00
2023/0176161 A1* 6/2023 Gunnarsson .......... H04W 64/00
455/456.1

FOREIGN PATENT DOCUMENTS

| CN | 103200610 A | 7/2013 |
| CN | 103582117 A | 2/2014 |
| CN | 110062457 A | 7/2019 |
| CN | 110557719 A | 12/2019 |
| CN | 110786024 A | 2/2020 |
| CN | 110998353 A | 4/2020 |

OTHER PUBLICATIONS

European Patent Office (EPO), "Extended European Search Report (including Supplementary Search Report and Opinion)," Application No. 21827825.7/EP4175327 (PCT/CN2021101785), issued to Datang Mobile Communications Equipment Co., Ltd., Notification Date: Jun. 12, 2024.

* cited by examiner

MEASUREMENT REPORTING METHOD, POSITIONING MEASUREMENT DEVICE, AND LOCATION MANAGEMENT FUNCTION

CROSS-REFERENCE TO RELATED APPLICATIONS

The present application is a National Stage of International Application No. PCT/CN2021/101785, filed on Jun. 23, 2021, which claims priority to Chinese patent application No. 202010590821.0, filed on Jun. 24, 2020, entitled "Measurement Reporting Method, Positioning Measurement Device, and Location Management Function", which is hereby incorporated by reference in its entirety.

FIELD

The present application relates to the field of communication technologies, and in particular, to a measurement reporting method, a positioning measurement device, and a location management function (LMF).

BACKGROUND

In a new radio (NR) of 5G, a location management function (LMF) receives a positioning measurement value reported by a terminal or a base station, and calculates a location of the terminal based on the positioning measurement value. The positioning measurement value includes a time measurement value, an angle measurement value and a power measurement value. However, the accuracy for positioning in 5G is limited due to limitations in signal bandwidth and sampling rate.

SUMMARY

Embodiments of the application provide a measurement reporting method, positioning measurement device and a location management function (LMF), to improve accuracy for positioning.

An embodiment of the application provides a measurement reporting method, performed by a positioning measurement device, and including:

receiving a positioning measurement report request message sent by the LMF; and reporting one or more positioning measurement values to the LMF based on the positioning measurement report request message, where the one or more positioning measurement values include one or more carrier phase measurement values.

The embodiment of the application provides a measurement reporting method, performed by a location management function (LMF), and includes:

sending a positioning measurement report request message to a positioning measurement device; and receiving one or more positioning measurement values reported by the positioning measurement device based on the positioning measurement report request message, where the one or more positioning measurement values include one or more carrier phase measurement values.

The embodiment of the application provides a measurement reporting device, which is applied to a positioning measurement device, and includes:

a receiving device, configured to receive a positioning measurement report request message sent by a location management function (LMF); and a reporting device, configured to report one or more positioning measurement values to the LMF based on the positioning measurement report request message, where the one or more positioning measurement values include one or more carrier phase measurement values.

The embodiment of the application provides a measurement reporting device, which is applied to a location management function (LMF), and includes:

a sending device, configured to send a positioning measurement report request message to a positioning measurement device; and a receiving device, configured to receive one or more positioning measurement values reported by the positioning measurement device based on the positioning measurement report request message, where the one or more positioning measurement values include one or more carrier phase measurement values.

The embodiment of the application provides a positioning measurement device, which includes a memory storing a computer program, and a processor, the computer program, when executed by the processor, causes the processor to perform the steps of the measurement reporting method performed by the positioning measurement device.

The embodiment of the application provides a location management function (LMF), which includes a memory storing a computer program, and a processor, the computer program, when executed by the processor, causes the processor to perform the steps of the measurement reporting method performed by the LMF.

An embodiment of the present application provides a non-transitory computer-readable storage medium, on which a computer program is stored, where the computer program, when executed by a processor, causes the processor to perform the steps of the measurement reporting method.

In the measurement reporting method, the positioning measurement device, and the LMF according to the embodiments of the present application, the positioning measurement device reports one or more positioning measurement values to the LMF, where the one or more positioning measurement values include one or more carrier phase measurement values, carrier phase measurement values for a positioning reference signal are reported, NR carrier phase positioning is supported, and accuracy for positioning is improved.

BRIEF DESCRIPTION OF THE DRAWINGS

In order to more clearly illustrate solutions disclosed in the embodiments of the present application or the related art, the drawings used in the descriptions of the embodiments or the prior art will be briefly described below. The drawings in the following description are only some embodiments of the present application, and other drawings can be obtained according to the drawings.

DETAILED DESCRIPTION

In order to make the embodiments of the present application clearer, the solutions in the embodiments of the present application will be clearly and completely described below with reference to the drawings in the embodiments of the present application, and the described embodiments are some embodiments of the present application, but not all embodiments.

In order to clearly describe solutions of the embodiments of the present application, in the embodiments of the present application, if words such as "first" and "second" are used to distinguish identical items or similar items with substantially the same functions and actions, words such as "first" and "second" do not limit the quantity and execution order.

In the embodiments of the present application, the term "plurality" means two or more, and other terms are similar thereto.

Furthermore, it should be appreciated that reference throughout this specification to "one embodiment" or "an embodiment" means that a particular feature, structure or characteristic described in connection with the embodiment is included in one or more embodiment of the present application. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In various embodiments of the present application, it should be understood that the sequence numbers of the following processes do not mean the execution sequence, and the execution sequence of each process should be determined by the function and the inherent logic of the process, and should not constitute any limitation to the implementation process of the embodiments of the present application.

In a positioning process, for downlink positioning, for example, for a downlink time difference of arrival (DL-TDOA) technology, a terminal may measure positioning reference signals sent by N transmission reception points/base stations (TRPs/gNB), obtain N positioning measurement values, and report these positioning measurement values, where each positioning measurement value corresponds to one TRP/gNB. For an uplink TDOA technology, a terminal sends uplink positioning reference signals, M gNBs measure the positioning reference signals, and each gNB determines a positioning measurement value and reports the positioning measurement value to the LMF. The LMF performs location calculation based on the positioning measurement values corresponding to multiple TRPs/gNBs (e.g., N positioning measurement values obtained through DL-TDOA, M positioning measurement values obtained through UL-TDOA). If positioning in horizontal and vertical dimensions is performed, positioning measurement values corresponding to three or more TRP/gNB are needed, and the location of the terminal can be determined through location calculation.

The accuracy of the measurement value directly affects the accuracy for positioning, and it is difficult to ensure the accuracy for positioning when the sampling rate of the receiving end is limited. To this end, the present application provides the following embodiments to improve the accuracy for positioning.

Figure 1:
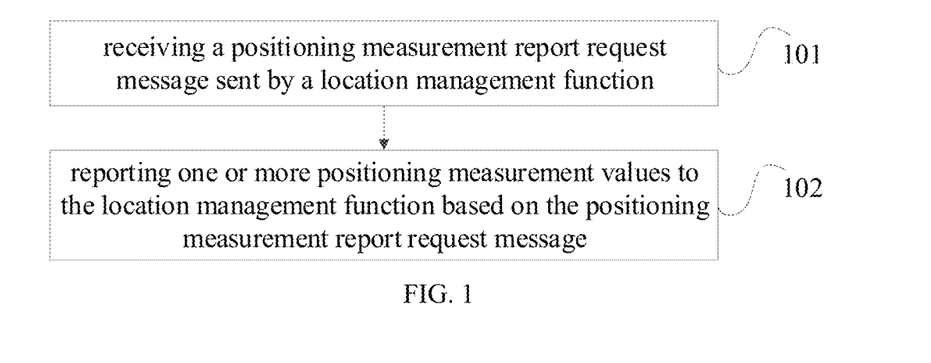
FIG. 1 is a flowchart illustrating steps of a measurement reporting method performed by a positioning measurement device according to an embodiment of the present application.

As shown in FIG. 1, it is a flowchart of a measurement reporting method performed by a positioning measurement device according to an embodiment of the present application, which includes the following steps.

Step 101: receiving a positioning measurement report request message sent by a location management function (LMF).

In an embodiment, the positioning measurement device may be a terminal or a base station.

When the positioning measurement device is a terminal, the positioning measurement report request message sent by the LMF may be a location request message for an LTE positioning protocol (LPP); when the positioning measurement device is a base station, the positioning measurement report request message sent by the LMF may be a measurement request message for a new radio positioning protocol A (NRPPa).

Step 102: reporting one or more positioning measurement values to the LMF based on the positioning measurement report request message.

The one or more positioning measurement values include one or more carrier phase measurement values.

In this step, when receiving the positioning measurement report request message sent by the LMF, the positioning measurement device may measure the positioning reference signals transmitted by each transmitting terminal (i.e., the base station or the terminal) based on the configuration of the LMF, obtain one or more positioning measurement values from each positioning reference signal, and report the one or more positioning measurement values to the LMF. The one or more positioning measurement values include one or more carrier phase measurement values.

In an embodiment, the one or more carrier phase measurement values may be multiple NR carrier phase measurement values. That is, in the NR system, phase measurement may be performed on multiple NR carriers to obtain NR carrier phase measurement values for the multiple NR carriers. Since the NR carriers have continuity, the carrier phase measurement values are not limited by the sampling rate, data acquisition can be performed according to actual requirements, and accuracy for positioning can be improved when positioning is performed based on the carrier phase measurement values.

Since the one or more positioning measurement values reported to the LMF includes the one or more carrier phase measurement value, the carrier phase measurement value for the positioning reference signal is reported, NR carrier phase positioning is supported, the measurement of the positioning measurement value is not limited by the sampling rate anymore, and the accuracy for positioning is improved.

In an embodiment, when the positioning measurement device is a terminal, the positioning measurement report request message may include one or more of the following information:

information for indicating whether to report an absolute value of a carrier phase; information for indicating whether to report a difference of a carrier phase; information for indicating whether to report the measurement value; information for indicating whether assistance data are present; information for indicating whether to report multipath measurement values; or reported configuration information.

In an embodiment, the measurement value may be reference signal receiving power (RSRP) or the like; the assistance data may be configuration information of a reference signal to be measured. In addition, the reported configuration information may be reported granularity, number, etc., and the details are not limited herein.

In addition, when the positioning measurement device is a base station, the positioning measurement report request message includes one or more of the following information:

information of the measured terminal; measurement identification information; configuration information of a reference symbol for carrier phase positioning measurement sent by the terminal; a measurement period; type information of the measurement value; or additional measurement information.

In an embodiment, the type of the measurement value can be an angle, a position and the like. In addition, the additional measurement information may be whether to perform a multipath measurement, and its content is not specifically limited herein.

In an embodiment, one or more carrier phase measurement values are reported in units of a carrier, where the carrier is a carrier in a carrier aggregation. That is, each carrier in the carrier aggregation reports one or more carrier phase measurement values.

In the present embodiment, the positioning measurement device may also report measurement qualities corresponding to all carrier phase measurement values in the one or more carrier phase measurement values to the LMF; or report measurement qualities corresponding to a part of the carrier phase measurement values in the one or more carrier phase measurement values to the LMF, where one carrier phase measurement value corresponds to one measurement quality.

In an embodiment, the measurement quality is used to indicate the accuracy of the corresponding positioning measurement value. For example, the measurement quality may include measurement errors and error step sizes.

In an embodiment, the carrier phase measurement value includes phase measurement values of N subcarriers representing a positioning reference signal; or, a phase measurement value of a first subcarrier among the N subcarriers representing the positioning reference signal and phase differences between the remaining subcarriers except the first subcarrier and the first subcarrier among the N subcarriers, where N is a positive integer greater than or equal to 1.

Since the phase measurement values of the N subcarriers are used as carrier phase measurement values for reporting, or the phase measurement value of the first subcarrier in the N subcarriers and the phase difference between the remaining subcarriers and the first subcarrier are used as carrier phase measurement values for reporting, the LMF can perform positioning or position the phase differences based on the carrier phase measurement values of the N subcarriers. Based on the continuity of NR carriers, the positioning data is not limited by the sampling rate anymore and can be sampled as required, and the accuracy for positioning is improved.

It should be noted that the N subcarriers are configured by any one of the following modes:

acquiring N subcarriers predefined by the system;

receiving configuration information of N subcarriers sent by the LMF; determining N subcarriers; or sending indication information of the N subcarriers to the LMF by the positioning measurement device.

That is, in this embodiment, the N subcarriers may be predefined by the system, the N subcarriers may also be configured by the LMF, and the N subcarriers may also be determined and indicated to the LMF by the positioning measurement device.

In addition, the first subcarrier is configured by any one of the following modes:

acquiring the first subcarrier predefined by the system;

receiving configuration information of a first subcarrier sent by a location management function (LMF); or determining the first subcarrier and sending indication information of the first subcarrier to the LMF by the positioning measurement device.

That is, the first subcarrier may be predefined by the system, the first subcarrier may be configured by the LMF, and the first subcarrier may be determined and indicated to the LMF by the positioning measurement device.

That is, the configuration of the N subcarriers and the first subcarrier is not specifically limited herein.

In an embodiment, the positioning measurement device may further receive expected value information of the carrier phase measurement value sent by the LMF, where the expected value information is used to indicate a value range of phase values of the subcarriers.

The LMF enables the terminal to search within a range by indicating the expected value information of the carrier phase measurement value to the terminal, the carrier phase measurement value can be obtained quickly, and the determination of the carrier phase is accelerated.

In an embodiment, the carrier phase measurement value may also be associated with an orthogonal frequency-division multiplexing (OFDM) symbol index, which is used for indicating the reported carrier phase measurement value is carrier phase measurement value corresponding to which OFDM symbol.

In an embodiment, the OFDM symbol index may be configured by any one of the following modes:

acquiring the OFDM symbol index predefined by a system;

receiving configuration information of the OFDM symbol index sent by the LMF; or determining the OFDM symbol index and sending an indication of the OFDM symbol index to the LMF by the positioning measurement device.

That is, the configuration of the OFDM symbol index is not specifically limited herein.

Additionally, further in this embodiment, the one or more positioning measurement values further include one or more of the following items:

information on the location of the terminal, error report information, measurement identification information, a difference of a carrier phase, a measurement quality of the difference of a carrier phase, a measurement quality of absolute measurement value of the carrier phase, a carrier phase change measurement value, a measurement quality of the carrier phase change measurement value, a carrier phase change rate, a measurement quality of the carrier phase change rate, a reception time measurement value, a measurement quality of the reception time measurement value, an angle measurement value, a measurement quality of the angle measurement value, a power measurement value, a measurement quality of the power measurement value, a velocity measurement value, a measurement quality of the velocity measurement value, a Doppler measurement value, a measurement quality of the Doppler measurement value, carrier phase measurement results of multicarrier, measurement qualities of the carrier phase measurement results of the multicarrier, direction indication information, time information during measurements or information on transmission reception points (TRP) referred during measurements.

In an embodiment, the velocity measurement value, the Doppler measurement value and the direction indication information may be obtained based on the carrier phase measurement values or the carrier phase change measurement value.

In an embodiment, assistant positioning for the terminal is carried out by reporting one or more of the above contents in the positioning measurement value.

In this embodiment, by including one or more carrier phase measurement values in one or more positioning measurement values, the carrier phase measurement value of the positioning reference signal is reported, NR carrier phase positioning is supported, and accuracy for positioning is improved.

Figure 2:
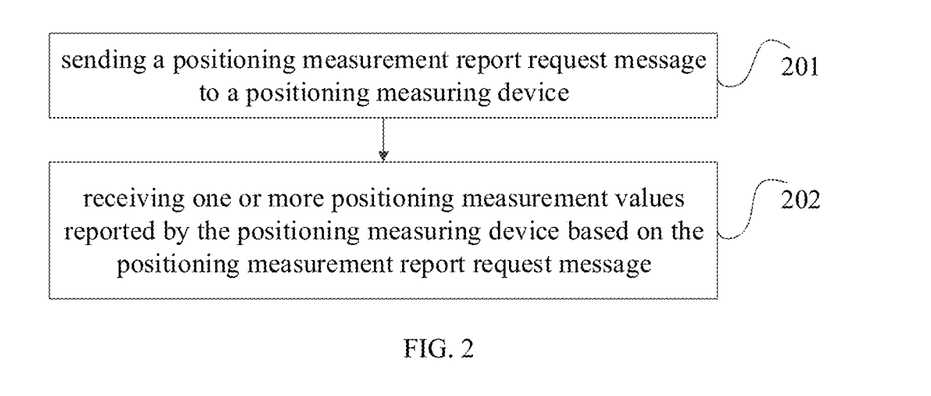
FIG. 2 is a flowchart illustrating steps of a measurement reporting method performed by a location management function (LMF) according to an embodiment of the present application.

In addition, as shown in FIG. 2, a flowchart of a measurement reporting method performed by a location management function (LMF) is shown, the method includes the following steps.

Step 201: sending a positioning measurement report request message to a positioning measurement device.

In an embodiment, the positioning measurement device may be a base station or a terminal.

When the positioning measurement device is a terminal, the positioning measurement report request message sent by the LMF may be a location request message for an LTE positioning protocol (LPP); when the positioning measurement device is a base station, the positioning measurement report request message sent by the LMF may be a measurement request message for a new radio positioning protocol A (NRPPa).

Step 202: receiving one or more positioning measurement values reported by the positioning measurement device based on the positioning measurement report request message.

The one or more positioning measurement values include one or more carrier phase measurement values.

In an embodiment, the one or more carrier phase measurement values may be multiple NR carrier phase measurement values. That is, in the NR system, phase measurement may be performed on multiple NR carriers to obtain NR carrier phase measurement values for the multiple NR carriers. Since the carrier phase measurement values are not limited by the sampling rate due to the continuity of the NR carriers, the accuracy for positioning can be improved when positioning is performed based on the carrier phase measurement values.

Since the one or more positioning measurement values includes the one or more carrier phase measurement value, the carrier phase measurement value for the positioning reference signal is reported, NR carrier phase positioning is supported, and the accuracy for positioning is improved.

In an embodiment, when the positioning measurement device is a terminal, the positioning measurement report request message may include one or more of the following information:

information for indicating whether to report an absolute value of a carrier phase; information for indicating whether to report a difference of a carrier phase; information for indicating whether to report the measurement value; information for indicating whether assistance data are present; or information for indicating whether to report multipath measurement value; or reported configuration information.

In addition, when the positioning measurement device is a base station, the positioning measurement report request message includes one or more of the following information:

information of the measured terminal; measurement identification information; configuration information of a reference symbol for carrier phase positioning measurement sent by the terminal; a measurement period; type information of the measurement value; or additional measurement information.

It should be noted that, for the specific description of the above, reference may be made to the related contents of the embodiment of the positioning measurement device side, and details are not described herein again.

In this embodiment, further, one or more carrier phase measurement values are reported in units of a carrier, where the carrier is a carrier in a carrier aggregation. That is, each carrier in the carrier aggregation reports one or more carrier phase measurement values.

In addition, in this embodiment, the LMF may further receive measurement qualities corresponding to all carrier phase measurement values in the one or more carrier phase measurement values reported by the positioning measurement device; or, receive the measurement qualities corresponding to a part of the one or more carrier phase measurement values reported by the positioning measurement device, where one carrier phase measurement value corresponds to one measurement quality.

In an embodiment, the measurement quality is used to indicate the accuracy of the corresponding positioning measurement value. For example, the measurement quality may include measurement errors and error step sizes.

In an embodiment, the carrier phase measurement includes phase measurement values of N subcarriers representing a positioning reference signal; or, a phase measurement value of a first subcarrier among the N subcarriers representing the positioning reference signal and phase differences between the remaining subcarriers except the first subcarrier and the first subcarrier among the N subcarriers, where N is a positive integer greater than or equal to 1.

It should be noted that the N subcarriers are configured by any one of the following modes:

acquiring the N subcarriers predefined by the system;

configuring the N subcarriers and sending configuration information of the N subcarriers to the positioning measurement device by the LMF; or receiving indication information of the N subcarriers sent by the positioning measurement device.

In addition, the first subcarrier is configured by any one of the following modes:

acquiring the first subcarrier predefined by the system; configuring the first subcarrier and sending configuration information of the first subcarrier to positioning measurement device by the LMF; or receiving indication information of the first subcarrier sent by the positioning measurement device.

That is, the configuration of the N subcarriers and the first subcarrier is not specifically limited herein.

In an embodiment, the LMF may further send expected value information of the carrier phase measurement value to the positioning measurement device, where the expected value information is used to indicate a value range of phase values of the subcarriers.

The LMF indicates the expected value information of the carrier phase measurement value to the terminal, the positioning measurement device can search within a range, to obtain the carrier phase measurement value and accelerating the determination of the carrier phase.

In an embodiment, the carrier phase measurement value may also be associated with an orthogonal frequency-division multiplexing (OFDM) symbol index, which is used for indicating the reported carrier phase measurement value is a carrier phase measurement value corresponding to which OFDM symbol.

In an embodiment, the OFDM symbol index may be configured by any one of the following modes:

acquiring the OFDM symbol index predefined by a system;

configuring the OFDM symbol index and sending configuration information of the OFDM symbol index to the positioning measurement device by the LMF; and receiving indication information of the OFDM symbol index sent by a positioning measurement device.

That is, the configuration of the OFDM symbol index is not specifically limited herein.

Additionally, further in this embodiment, the one or more positioning measurement values further include one or more of the following items:

information on the location of the terminal, error report information, measurement identification information, a difference of a carrier phase, a measurement quality of the difference of a carrier phase, a measurement quality of absolute measurement value of the carrier phase, a carrier phase change measurement value, a measurement quality of the carrier phase change measurement value, a carrier phase change rate, a measurement quality of the carrier phase change rate, a reception time measurement value, a measurement quality of the reception time measurement value, an angle measurement value, a measurement quality of the angle measurement value, a power measurement value, a measurement quality of the power measurement value, a velocity measurement value, a measurement quality of the velocity measurement value, a Doppler measurement value, a measurement quality of the Doppler measurement value, carrier phase measurement results of a multicarrier, measurement qualities of the carrier phase measurement results of the multicarrier, direction indication information, time information during measurements or information on transmission reception points (TRP) referred during measurements.

In an embodiment, the velocity measurement value, the Doppler measurement value and the direction indication information may be obtained based on the carrier phase measurement values or the carrier phase change measurement value.

In an embodiment, assistant positioning for the terminal is carried out by reporting one or more of the above contents in the positioning measurement value.

In this embodiment, by including one or more carrier phase measurement values in one or more positioning measurement values, the carrier phase measurement value of the positioning reference signal is reported, NR carrier phase positioning is supported, and the accuracy for positioning is improved.

The present application will be specifically described below by way of specific examples.

Example 1

Figure 3:
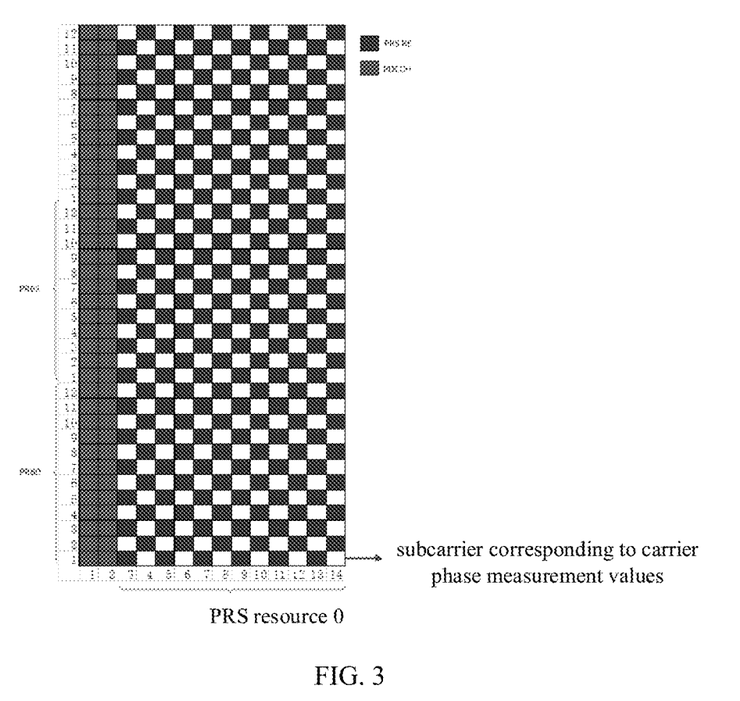
FIG. 3 is a reference schematic diagram of a first embodiment according to an embodiment of the present application.

As shown in FIG. 3, assuming that M=1 positioning reference signal (PRS) resource is configured for each transmission reception point (TRP), each PRS resource occupies 12 orthogonal frequency division multiplexing (OFDM) symbols by using comb=2, where PRS RE represents s PRS resource element and PDCCH represents a physical downlink control channel. In addition, the LMF configures the terminal to report NR carrier phase measurement values of P=4 TRPs (represented as TRP0, TRP1, TRP2, and TRP3), and the system agrees that the NR carrier phase measurement value is a phase measurement value for N=1 subcarrier. The LMF indicates that the subcarrier of the NR carrier phase measurement is the subcarrier with a smallest subcarrier index within the PRS bandwidth, such as a subcarrier 1 of a physical resource block (PRB0) in FIG. 3. The LMF indicates that the NR carrier phase measurement value is associated with an OFDM symbol 9, which indicates that the reported NR carrier phase measurement value is the NR carrier phase measurement value corresponding to the OFDM symbol 9.

In addition, a phase locked loop (PLL) of the terminal enters a locked state after OFDM symbol 3 to OFDM symbol elapse, and can output a phase measurement value corresponding to the OFDM symbol 9. When the terminal reports the measurement, the 1 NR carrier phase measurement value is reported for PRS resource 0 of TRP0. Similar to TRP0, the report of TRP1 to TRP3 will not be described again. The LMF obtains the phase difference between different TRPs according to the phase measurement values of the total 4 NR carriers reported by the terminal, and calculates a location of the terminal.

In an embodiment, a velocity/Doppler measurement value can be obtained based on the phase change rate between different OFDM symbols, and the terminal can also report the velocity/Doppler measurement value.

For each NR carrier phase measurement value, the terminal can also report the measurement quality of the NR carrier phase measurement value. The measurement quality is used to describe the accuracy of this measurement value. For example, the measurement error and the error step size can be used to define this measurement quality. In addition, in this embodiment, the subcarriers corresponding to the NR carrier phase measurement may be indicated by the LMF, or the terminal may determine the subcarriers corresponding to the NR carrier phase measurement. For example, the terminal determines to output the phase measurement value of a subcarrier 2 in PRB0 as the NR carrier phase measurement. The terminal reports the subcarrier index to the LMF in the report.

The downlink positioning procedure is described above. For uplink positioning, a terminal can send a sounding reference signal (SRS), and a base station measures and reports an NR carrier phase measurement value. This is similar to the principle of the downlink positioning, and will not be described here.

Example 2

Figure 4:
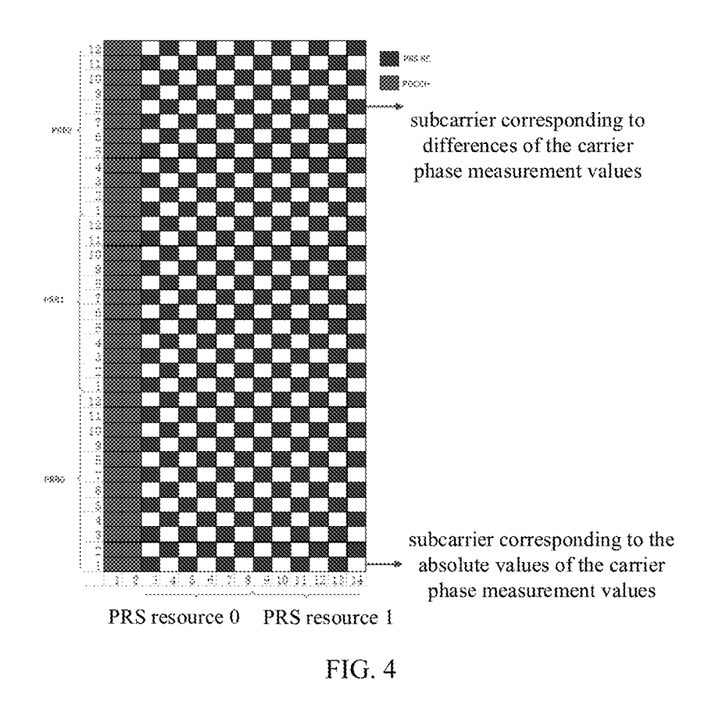
FIG. 4 is a reference schematic diagram of a second embodiment according to an embodiment of the present application.

As shown in FIG. 4, assuming that M=2 PRS resources are configured for each TRP, each PRS resource occupies 6 OFDM symbols by using comb=2 and different PRS resources point to different directions. The LMF configures the terminal to report NR carrier phase measurement values of P=3 TRPs (represented as TRP0, TRP1 and TRP 2). The system agrees that the NR carrier phase measurement values include phase measurement values for N=2 subcarriers, represented as absolute phase measurement values and differential phase measurement values corresponding to the first subcarrier. The system predefines the first subcarrier as the subcarrier with the smallest subcarrier index in the PRS bandwidth, such as a subcarrier 1 of PRB0 in FIG. 4.

The terminal measures the receiving power of the two PRS resources and determines the PRS resource with higher receiving power to be used as the measurement resource for the NR carrier phase measurement value. For example, if the terminal measures that the receiving power of a PRS resource 1 is large, it is used as a measurement resource to perform NR carrier phase measurement. The terminal reports the index of the PRS resource 1 to the LMF. The terminal determines the subcarrier corresponding to the difference of the NR carrier phase measurement value. For example, if a subcarrier 8 of PRB2 is determined, its subcarrier index is reported to the LMF. A phase locked loop (PLL) of the terminal enters a locked state after 2 OFDM symbols elapse. For the PRS resource 1, i.e. after OFDM symbol 9 and OFDM symbol 10 elapse, the PLL is locked. The terminal determines to report the NR carrier phase measurement value corresponding to a symbol 11, and reports a OFDM symbol index 11 as the OFDM symbol index associated with the NR carrier phase measurement value to the LMF. The terminal measures and obtains an absolute value $\varphi\_0$ of the NR carrier phase of a PRB0 subcarrier 1, measures and obtains an absolute value $\varphi\_1$ of the NR carrier phase of a PRB2 subcarrier 8, and obtains a difference $\varphi\_1-\varphi\_0$ after subtracting this absolute value from the absolute value of the subcarrier 1. The terminal reports the absolute value $\varphi\_0$ and the difference $\varphi\_1-\varphi\_0$ to the positioning as the NR carrier phase measurement value.

In an embodiment, in order to accelerate the determination of the NR carrier phase, the LMF may also indicate expected value information of the NR carrier phase measurement value to the terminal, the terminal searches within a range to quickly obtain the NR carrier phase measurement value. Similarly, for the reporting of TRP1 to TRP2, similar to TRP0, the detailed description thereof is omitted. The LMF obtains the phase difference between different TRPs according to the phase measurement values (each measurement value includes an absolute measurement value and a differential measurement value) of the total 3 NR carriers reported by the terminal, and calculates a location of the terminal.

In this embodiment, measurement reporting of one carrier (CC) is given. In a carrier aggregation scenario, each carrier needs to perform the above measurement reporting.

Example 3

When the terminal reports the measurement result, the following steps are performed:

the terminal determines the measurement content of the NR carrier phase to be reported according to an LTE positioning protocol (LPP) location request message issued by a location management function (LMF). One or more of the following information of NR carrier phase positioning may be carried in the LPP location request message:

whether to report the absolute value of the NR carrier phase; whether to report the difference of the NR carrier phases; whether to report the NR measurement values, such as RSRP and the like; whether valid assistance data are present; whether to report the multipath; the reported configuration information, such as reported particle sizes, number, etc.

The terminal reports the measurement result or the position result through the LPP position providing message according to an indication in the LPP location request message. For example, one or more of the following information is reported in the LPP location providing message:

NR carrier phase measurement values; information on the location of the terminal; error report information.

The measurement result of the NR carrier phase includes the measurement results in the first embodiment and the second embodiment, that is, one or more of the following are included:

an absolute measurement value of the NR carrier phase; a difference of the NR carrier phase; a reception time measurement value; an angle measurement value; a power measurement value; a velocity measurement value; Doppler measurement values; NR carrier phase measurement values for multiple carriers; information of the TRP referred during measurements; measured time information; a measurement quality of an absolute measurement value of NR carrier phase; the measurement quality of the difference of the NR carrier phase; a measurement quality of the received time measurement value; a measurement quality of the angle measurement value; a measurement quality of the power measurement value; a measurement quality of the velocity measurement value; the measurement quality of the Doppler measurement values; measurement quality of NR carrier phase measurement values for multiple carriers.

In example 4, the base station reports the measurement result as follows:

when the terminal transmits the positioning reference signals for the NR carrier phases, the base station performs measurement of the terminal signal. Measurement requests and measurement results related to NR carrier phase positioning method can be interacted through the location information transmission process in the NRPPa protocol.

One or more of the following information is provided in a measurement request message for NRPPa:

information of the measured terminal; measurement identification information; configuration information of a reference symbol used for NR carrier phase positioning measurement sent by a terminal; a measurement period; measurement quantity; or other additional measured information.

The base station provides one or more of the following measurement information to the LMF through the measurement report message of NRPPa:

measurement identification information; an absolute measurement value of the NR carrier phase; a difference of the NR carrier phase; a reception time measurement value; an angle measurement value; a power measurement value; a velocity measurement value; Doppler measurement values; NR carrier phase measurement values for multiple carriers; information of the TRP referred during measurements; measured time information; a measurement quality of an absolute measurement value of NR carrier phase; the measurement quality of the difference of the NR carrier phase; a measurement quality of the received time measurement value; a measurement quality of the angle measurement value; a measurement quality of the power measurement value; a measurement quality of the velocity measurement value; the measurement quality of the Doppler measurement values; or measurement quality of NR carrier phase measurement values for multiple carriers.

Figure 5:
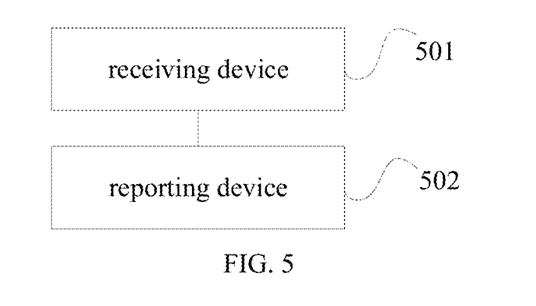
FIG. 5 is a block diagram of a measurement reporting device applied to a positioning measurement device according to the embodiment of the present application.

In addition, as shown in FIG. 5, a block diagram of a measurement reporting apparatus in this embodiment is applied to a positioning measurement device, and the measurement reporting apparatus includes:

a receiving device 501, configured to receive a positioning measurement report request message sent by a location management function (LMF); and a reporting device 502, configured to report one or more positioning measurement values to the LMF based on the positioning measurement report request message, where the one or more positioning measurement values include one or more carrier phase measurement values.

In an embodiment, the carrier phase measurement values include:

phase measurement values of N subcarriers representing a positioning reference signal; or, a phase measurement value of a first subcarrier among the N subcarriers representing the positioning reference signal and phase differences between the remaining subcarriers except the first subcarrier and the first subcarrier among the N subcarriers, where N is a positive integer greater than or equal to 1.

In an embodiment, the N subcarriers are configured by any one of the following modes:

acquiring the N subcarriers predefined by a system;

receiving configuration information of the N subcarriers sent by the LMF; or determining the N subcarriers and sending indication information of the N subcarriers to the LMF by the positioning measurement device.

In an embodiment, the first subcarrier is configured by any one of the following modes:

acquiring the first subcarrier predefined by a system;

receiving configuration information of the first subcarrier sent by the LMF; or determining the first subcarrier and sending the indication information of the first subcarrier to the LMF by the positioning measurement device.

In an embodiment, the receiving device 501 is further configured to:

receive expected value information of the carrier phase measurement value sent by the LMF, where the expected value information is used for indicating a value range of phase values of the subcarriers.

In an embodiment, each carrier phase measurement value is associated with an orthogonal frequency division multiplexing (OFDM) symbol index;

where the OFDM symbol index is configured by any one of the following modes:

acquiring the OFDM symbol index predefined by a system;

receiving configuration information of the OFDM symbol index sent by the LMF; or determining the OFDM symbol index and sending indication information of the OFDM symbol index to the LMF by the positioning measurement device.

In an embodiment, the one or more carrier phase measurement values is reported in units of a carrier, where the carrier is a carrier in a carrier aggregation.

In an embodiment, the one or more positioning measurement values further include one or more of the following items:

information on the location of the terminal, error report information, measurement identification information, a difference of a carrier phase, a measurement quality of the difference of a carrier phase, a measurement quality of absolute measurement value of the carrier phase, a carrier phase change measurement value, a measurement quality of the carrier phase change measurement value, a carrier phase change rate, a measurement quality of the carrier phase change rate, a reception time measurement value, a measurement quality of the reception time measurement value, an angle measurement value, a measurement quality of the angle measurement value, a power measurement value, a measurement quality of the power measurement value, a velocity measurement value, a measurement quality of the velocity measurement value, a Doppler measurement value, a measurement quality of the Doppler measurement value, carrier phase measurement results of a multicarrier, measurement qualities of the carrier phase measurement results of the multicarrier, direction indication information, time information during measurements or information on transmission reception points (TRP) referred during measurements.

In an embodiment, the velocity measurement value, the Doppler measurement value, and the direction indication information are obtained based on the carrier phase measurement values or the carrier phase change measurement value.

In an embodiment, the reporting device 502 is further configured to:

report measurement qualities corresponding to all carrier phase measurement values in the one or more carrier phase measurement values to the LMF; or, report the measurement qualities corresponding to a part of the carrier phase measurement values in the one or more carrier phase measurement values to the LMF, where one carrier phase measurement value corresponds to one measurement quality.

In an embodiment, when the positioning measurement device is a terminal, the positioning measurement report request message includes one or more of the following information:

information for indicating whether to report an absolute value of a carrier phase;

information for indicating whether to report a difference of a carrier phase;

information for indicating whether to report a measurement value;

information for indicating whether assistance data are present;

information for indicating whether to report a multipath measurement value; or reported configuration information.

In an embodiment, when the positioning measurement device is a base station, the positioning measurement report request message includes one or more of the following information:

information of the measured terminal;

measurement identification information;

configuration information of a reference symbol for carrier phase positioning measurement sent by a terminal;

a measurement period;

type information of the measurement value; or additional measurement information.

The apparatus provided in this embodiment can perform all the method steps that can be implemented in the above-described method embodiment of positioning measurement device, and can achieve the same effects, which are not described herein again.

Figure 6:
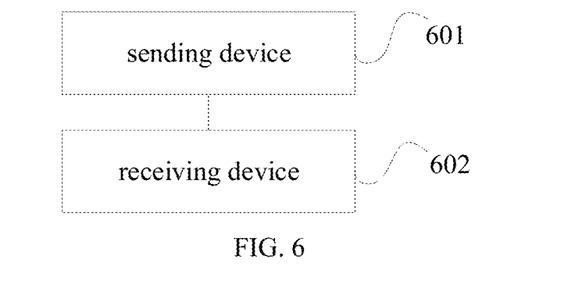
FIG. 6 is a block diagram of a measurement reporting device applied to a location management function (LMF) according to an embodiment of the present application.

In addition, as shown in FIG. 6, a block diagram of a measurement reporting apparatus in an embodiment of the present application is performed by a location management function (LMF), and includes:

a sending device 601, configured to send a positioning measurement report request message to a positioning measurement device; and a receiving device 602, configured to receive one or more positioning measurement values reported by the positioning measurement device based on the positioning measurement report request message, where the one or more positioning measurement values include one or more carrier phase measurement values.

In an embodiment, the carrier phase measurement values include:
  phase measurement values of N subcarriers representing a positioning reference signal; or,
  a phase measurement value of a first subcarrier among the N subcarriers representing the positioning reference signal and phase differences between the remaining the rest subcarriers except the first subcarrier and the first subcarrier among the N subcarriers,
  where N is a positive integer greater than or equal to 1.

In an embodiment, the N subcarriers is configured by any one of the following modes:
  acquiring the N subcarriers predefined by a system;
  configuring the N subcarriers and sending configuration information of the N subcarriers to the positioning measurement device by the LMF; and
  receiving indication information of the N subcarriers sent by the positioning measurement device.

In an embodiment, the first subcarrier is configured by any one of the following modes:
  acquiring the first subcarrier predefined by a system;
  configuring the first subcarrier and sending configuration information of the first subcarrier to the positioning measurement device by the LMF; or
  receiving indication information of the first subcarrier sent by the positioning measurement device.

In an embodiment, the sending device 601 is further configured to:
  send expected value information of the carrier phase measurement value to the positioning measurement device, where the expected value information is used for indicating a value range of phase values of the subcarriers.

In an embodiment, each carrier phase measurement value is associated with an orthogonal frequency division multiplexing (OFDM) symbol index;
  where the OFDM symbol index is configured by any one of the following mode:
  acquiring the OFDM symbol index predefined by a system;
  configuring the OFDM symbol index and sending configuration information of the OFDM symbol index to the positioning measurement device by the LMF; and
  receiving indication information of the OFDM symbol index sent by the positioning measurement device.

In an embodiment, the one or more carrier phase measurement values is reported in units of a carrier, where the carrier is a carrier in a carrier aggregation.

In an embodiment, the one or more positioning measurement values further include one or more of the following items:
  information on the location of the terminal, error report information, measurement identification information, a difference of a carrier phase, a measurement quality of the difference of a carrier phase, a measurement quality of absolute measurement value of the carrier phase, a carrier phase change measurement value, a measurement quality of the carrier phase change measurement value, a carrier phase change rate, a measurement quality of the carrier phase change rate, a reception time measurement value, a measurement quality of the reception time measurement value, an angle measurement value, a measurement quality of the angle measurement value, a power measurement value, a measurement quality of the power measurement value, a velocity measurement value, a measurement quality of the velocity measurement value, a Doppler measurement value, a measurement quality of the Doppler measurement value, carrier phase measurement results of a multicarrier, measurement qualities of the carrier phase measurement results of the multicarrier, direction indication information, time information during measurements or information on transmission reception points (TRP) referred during measurements.

In an embodiment, the velocity measurement value, the Doppler measurement value, and the direction indication information are obtained based on the carrier phase measurement values or the carrier phase change measurement value.

In an embodiment, the receiving device 602 is further configured to:
  receive measurement quality corresponding to all carrier phase measurement values in the one or more carrier phase measurement values reported by the positioning measurement device; or,
  receive measurement quality corresponding to a part of carrier phase measurement values in the one or more carrier phase measurement values reported by the positioning measurement device,
  where one carrier phase measurement value corresponds to one measurement quality.

In an embodiment, when the positioning measurement device is a terminal, the positioning measurement report request message includes one or more of the following information:
  information for indicating whether to report an absolute value of a carrier phase;
  information for indicating whether to report a difference of a carrier phase;
  information for indicating whether to report a measurement value;
  information for indicating whether assistance data are present;
  information for indicating whether to report a multipath measurement value; or
  reported configuration information.

In an embodiment, when the positioning measurement device is a base station, the positioning measurement report request message includes one or more of the following information:
  information of the measured terminal;
  measurement identification information;
  configuration information of a reference symbol for carrier phase positioning measurement sent by a terminal;
  a measurement period;
  type information of the measurement value; or
  additional measurement information.

The apparatus provided in this embodiment can perform all the method steps that can be implemented in the above-described embodiment of the method for positioning a server, and can achieve the same effects, which are not described herein again.

Figure 7:
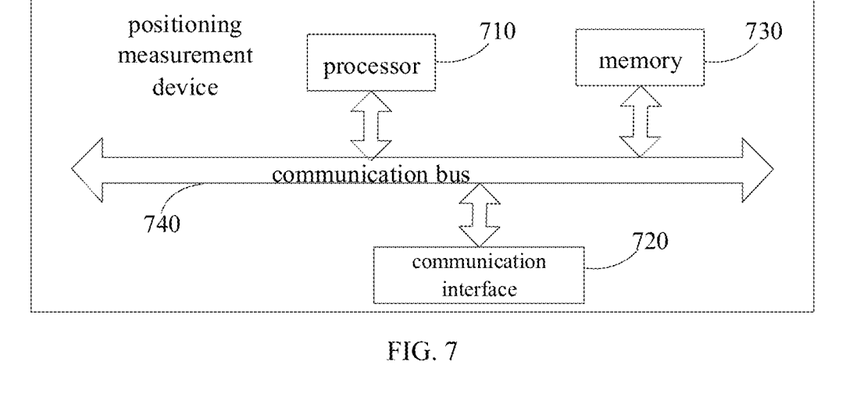
FIG. 7 is a schematic structural diagram of a positioning measurement device according to an embodiment of the present application.

In addition, as shown in FIG. 7, for a structural schematic diagram of the positioning measurement device according to the embodiment of the present application, the positioning measurement device may include: a processor 710, a communication interface 720, a memory 730, and a communication bus 740, where the processor 710, the communication interface 720, and the memory 730 communicate with each other via the communication bus 740. The processor 710 may invoke a computer program stored on memory 730 and executable on processor 710 to perform the following steps:

receiving a positioning measurement report request message sent by a location management function (LMF); and reporting one or more positioning measurement values to the LMF based on the positioning measurement report request message, where the one or more positioning measurement values include one or more carrier phase measurement values.

In an embodiment, the carrier phase measurement values include:

phase measurement values of N subcarriers representing a positioning reference signal; or, a phase measurement value of a first subcarrier among the N subcarriers representing the positioning reference signal and phase differences between the remaining subcarriers except the first subcarrier and the first subcarrier among the N subcarriers, where N is a positive integer greater than or equal to 1.

In an embodiment, the N subcarriers is configured by any one of the following modes:

acquiring the N subcarriers predefined by a system;

receiving configuration information of the N subcarriers sent by the LMF; and determining the N subcarriers and sending indication information of the N subcarriers to the LMF by the positioning measurement device.

In an embodiment, the first subcarrier is configured by any one of the following modes:

acquiring the first subcarrier predefined by a system;

receiving configuration information of the first subcarrier sent by the LMF; or determining the first subcarrier and sending the indication information of the first subcarrier to the LMF by the positioning measurement device.

In an embodiment, the computer program causes the processor 710 to further perform the following steps: receive expected value information of the carrier phase measurement value sent by the LMF, where the expected value information is used for indicating a value range of phase values of the subcarriers.

In an embodiment, each carrier phase measurement value is associated with an orthogonal frequency division multiplexing (OFDM) symbol index;

where the OFDM symbol index is configured by any one of the following modes:

acquiring the OFDM symbol index predefined by a system;

receiving configuration information of the OFDM symbol index sent by the LMF; or determining the OFDM symbol index and sending indication information of the OFDM symbol index to the LMF by the positioning measurement device.

In an embodiment, the one or more carrier phase measurement values is reported in units of a carrier, where the carrier is a carrier in a carrier aggregation.

In an embodiment, the one or more positioning measurement values further include one or more of the following items:

information on the location of the terminal, error report information, measurement identification information, a difference of a carrier phase, a measurement quality of the difference of a carrier phase, a measurement quality of absolute measurement value of the carrier phase, a carrier phase change measurement value, a measurement quality of the carrier phase change measurement value, a carrier phase change rate, a measurement quality of the carrier phase change rate, a reception time measurement value, a measurement quality of the reception time measurement value, an angle measurement value, a measurement quality of the angle measurement value, a power measurement value, a measurement quality of the power measurement value, a velocity measurement value, a measurement quality of the velocity measurement value, a Doppler measurement value, a measurement quality of the Doppler measurement value, carrier phase measurement results of a multicarrier, measurement qualities of the carrier phase measurement results of the multicarrier, direction indication information, time information during measurements or information on transmission reception points (TRP) referred during measurements.

In an embodiment, the velocity measurement value, the Doppler measurement value, and the direction indication information are obtained based on the carrier phase measurement values or the carrier phase change measurement value.

In an embodiment, the computer program causes the processor 710 to further implement the following steps: report measurement qualities corresponding to all carrier phase measurement values in the one or more carrier phase measurement values to the LMF; or, report the measurement qualities corresponding to a part of the carrier phase measurement values in the one or more carrier phase measurement values to the LMF, where one carrier phase measurement value corresponds to one measurement quality.

In an embodiment, when the positioning measurement device is a terminal, the positioning measurement report request message includes one or more of the following information:

information for indicating whether to report an absolute value of a carrier phase;

information for indicating whether to report a difference of a carrier phase;

information for indicating whether to report a measurement value;

information for indicating whether assistance data are present;

information for indicating whether to report a multipath measurement value; or reported configuration information.

In an embodiment, when the positioning measurement device is a base station, the positioning measurement report request message includes one or more of the following information:

information of the measured terminal;

measurement identification information;

configuration information of a reference symbol for carrier phase positioning measurement sent by a terminal;

a measurement period;

type information of the measurement value; or additional measurement information.

The positioning measurement device provided in this embodiment can perform all the method steps that can be implemented by the above positioning measurement device method embodiment, and can achieve the same effects, which are not described herein again.

In addition, the logic instructions in the memory 730 can be implemented in the form of software functional units and stored in a computer readable storage medium when the logic instructions are sold or used as independent products. Based on such understanding, the solutions of the present application or portions thereof that substantially contribute to the prior art may be embodied in the form of a software product, which is stored in a storage medium and includes several instructions for causing a computer device (which may be a personal computer, a server, or a network device) to execute all or part of the steps of the methods described in the embodiments of the present application. And the aforementioned storage medium includes: a U-disk, a removable hard disk, a read-only memory (ROM), a random access memory (RAM), a magnetic disk, or a compact disk, and various media for storing program codes.

Figure 8:
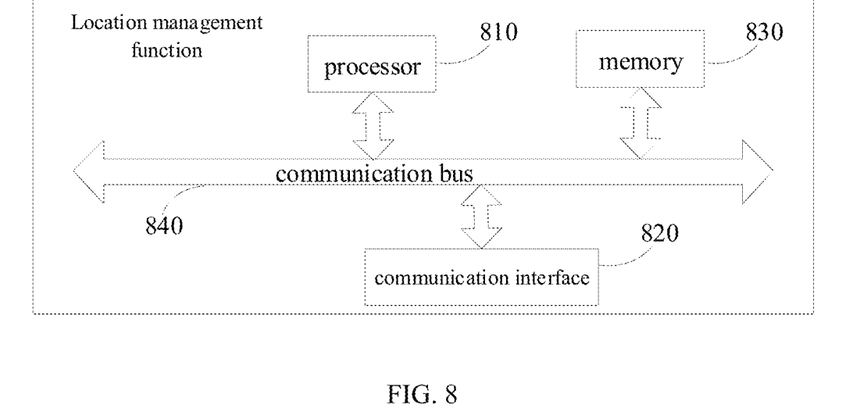
FIG. 8 is a schematic structural diagram of a location management function (LMF) according to an embodiment of the present application.

In addition, as shown in FIG. 8, for a structural schematic diagram of the LMF provided in the embodiment of the present application, the LMF may include: a processor 810, a communication interface 820, a memory 830 and a communication bus 840, where the processor 810, the communication interface 820 and the memory 830 communicate with each other via the communication bus 840. The processor 810 may invoke a computer program stored on the memory 830 and executable on the processor 810 to perform the steps of:

sending a positioning measurement report request message to a positioning measurement device; and receiving one or more positioning measurement values reported by the positioning measurement device based on the positioning measurement report request message, where the one or more positioning measurement values include one or more carrier phase measurement values.

In an embodiment, the carrier phase measurement values include:
  phase measurement values of N subcarriers representing a positioning reference signal; or,
  a phase measurement value of a first subcarrier among the N subcarriers representing the positioning reference signal and phase differences between the remaining subcarriers except the first subcarrier and the first subcarrier among the N subcarriers,
  where N is a positive integer greater than or equal to 1.

In an embodiment, the N subcarriers is configured by any one of the following modes:
  acquiring the N subcarriers predefined by a system;
  configuring the N subcarriers and sending configuration information of the N subcarriers to the positioning measurement device by the LMF; and
  receiving indication information of the N subcarriers sent by the positioning measurement device.

In an embodiment, the first subcarrier is configured by any one of the following modes:
  acquiring the first subcarrier predefined by a system;
  configuring the first subcarrier and sending configuration information of the first subcarrier to the positioning measurement device by the LMF; or
  receiving indication information of the first subcarrier sent by the positioning measurement device.

In an embodiment, the computer program causes the processor 810 to further implement the following steps:
  sending expected value information of the carrier phase measurement value to the positioning measurement device, where the expected value information is used for indicating a value range of phase values of the subcarriers.

In an embodiment, each carrier phase measurement value is associated with an orthogonal frequency division multiplexing (OFDM) symbol index;
  where the OFDM symbol index is configured by any one of the following modes:
  acquiring the OFDM symbol index predefined by a system;
  configuring the OFDM symbol index and sends configuration information of the OFDM symbol index to the positioning measurement device by the LMF; or
  receiving indication information of the OFDM symbol index sent by the positioning measurement device.

In an embodiment, the one or more carrier phase measurement values is reported in units of a carrier, where the carrier is a carrier in a carrier aggregation.

In an embodiment, the one or more positioning measurement values further include one or more of the following items:
  information on the location of the terminal, error report information, measurement identification information, a difference of a carrier phase, a measurement quality of the difference of a carrier phase, a measurement quality of absolute measurement value of the carrier phase, a carrier phase change measurement value, a measurement quality of the carrier phase change measurement value, a carrier phase change rate, a measurement quality of the carrier phase change rate, a reception time measurement value, a measurement quality of the reception time measurement value, an angle measurement value, a measurement quality of the angle measurement value, a power measurement value, a measurement quality of the power measurement value, a velocity measurement value, a measurement quality of the velocity measurement value, a Doppler measurement value, a measurement quality of the Doppler measurement value, carrier phase measurement results of a multicarrier, measurement qualities of the carrier phase measurement results of the multicarrier, direction indication information, time information during measurements or information on transmission reception points (TRP) referred during measurements.

In an embodiment, the velocity measurement value, the Doppler measurement value, and the direction indication information are obtained based on the carrier phase measurement values or the carrier phase change measurement value.

In an embodiment, the computer program causes the processor 810 to further implement the following steps:
  receive measurement quality corresponding to all carrier phase measurement values in the one or more carrier phase measurement values reported by the positioning measurement device; or,
  receive measurement quality corresponding to a part of carrier phase measurement values in the one or more carrier phase measurement values reported by the positioning measurement device, where one carrier phase measurement value corresponds to one measurement quality.

In an embodiment, when the positioning measurement device is a terminal, the positioning measurement report request message includes one or more of the following information:
  information for indicating whether to report an absolute value of a carrier phase;
  information for indicating whether to report a difference of a carrier phase;
  information for indicating whether to report a measurement value;
  information for indicating whether assistance data are present;
  information for indicating whether to report a multipath measurement value; or
  reported configuration information.

In an embodiment, when the positioning measurement device is a base station, the positioning measurement report request message includes one or more of the following information:
  information of the measured terminal;
  measurement identification information;

configuration information of a reference symbol for carrier phase positioning measurement sent by a terminal;
a measurement period;
type information of the measurement value; or
additional measurement information.

The LMF provided in this embodiment can perform all the method steps that can be implemented by the LMF method embodiment, and can achieve the same effects, which are not described herein again.

In addition, the logic instructions in the memory 830 can be implemented in the form of software functional units and stored in a computer readable storage medium when the software functional units are sold or used as independent products. Based on such understanding, the solutions of the present application or portions thereof that substantially contribute to the prior art may be embodied in the form of a software product, which is stored in a storage medium and includes several instructions for causing a computer device (which may be a personal computer, a server, or a network device) to execute all or part of the steps of the methods described in the embodiments of the present application. And the aforementioned storage medium includes: a U-disk, a removable hard disk, a read-only memory (ROM), a random access memory (RAM), a magnetic disk, or a compact disk, and various media for storing program codes.

The foregoing mainly introduces aspects of the embodiments of the present application from the perspective of electronic devices. It is understood that, in order to implement the functions described above, the electronic device provided in the embodiments of the present application includes a hardware structure and/or a software module for performing each function. Various illustrative elements and algorithm steps described in connection with the embodiments disclosed herein may be implemented as hardware or combinations of hardware and computer software.

Whether a function is performed in hardware or computer software drives hardware depends upon the particular application and design constraints imposed on the solution. The described functionality may be implemented in varying ways for each particular application, but such implementation decisions should not be interpreted as being departed from the scope of the present application.

In the embodiment of the present application, the electronic device and the like may be divided into functional modules according to the method example, for example, each functional module may be divided corresponding to each function, or two or more functions may be integrated into one processing module. The integrated module can be realized in a hardware mode, and can also be realized in a software functional module mode.

It should be noted that, in the embodiment of the present application, the division of the module is schematic, and is only one logic function division, and another division manner may be available in actual implementation.

For convenience and simplicity of description, the above division of each functional module is only used for illustration, and in practical applications, the above function distribution may be performed by different functional modules as needed, that is, the internal structure of the device is divided into different functional modules to perform all or part of the above described functions. For the specific working processes of the system, the apparatus and the unit described above, reference may be made to the corresponding processes in the foregoing method embodiments, and details are not described here again.

In the several embodiments provided in the present application, it should be understood that the disclosed apparatus and method may be implemented in other manners. For example, the above-described apparatus embodiments are merely illustrative, and for example, the division of the modules or units is only one type of logical functional division, and other divisions may be realized in practice, for example, multiple units or components may be combined or integrated into another system, or some features may be omitted, or not executed. In addition, the shown or discussed coupling or direct coupling or communication connection between each other may be an indirect coupling or communication connection through some interfaces, devices or units.

The units described as separate parts may or may not be physically separate, and parts displayed as units may or may not be physical units, may be located in one position, or may be distributed on multiple network units. Some or all of the units can be selected according to actual needs to achieve the purpose of the solution of the embodiment.

In addition, functional units in the embodiments of the present application may be integrated into one processing unit, or each unit may exist alone physically, or two or more units are integrated into one unit. The integrated unit may be implemented in the form of a software functional unit.

The integrated unit, if implemented in the form of a software functional unit and sold or used as a stand-alone product, may be stored in a computer readable storage medium. Based on such understanding, all or part of the solution can be embodied in the form of a software product, which is stored in a storage medium and includes several instructions to enable a computer device (which may be a personal computer, a server, or a network device) or a processor to execute all or part of the steps of the method according to the embodiments of the present application. The computer storage medium is a non-transitory (English: non-transitory) medium, including various media that can store program code, such as flash memory, removable hard drive, read-only memory, random-access memory, magnetic or optical disk, etc.

On the other hand, embodiments of the present application further provide a non-transitory computer-readable storage medium, on which a computer program is stored, where the computer program, when executed by a processor, implements the method steps provided in the foregoing embodiments and can achieve the same effects, and details are not repeated herein.

Finally, it should be noted that: the above examples are only intended to illustrate the solution of the present application, not to limit it; although the present application has been described in detail with reference to the foregoing embodiments, it should be understood that: the implementations described in the foregoing embodiments may still be modified, or some features may be equivalently replaced; such modifications and substitutions do not depart from the scope of the implementations of the embodiments of the present application.

What is claimed is:

1. A measurement reporting method, performed by a positioning measurement device, comprising:
   receiving a positioning measurement report request message sent by a location management function (LMF); and
   reporting one or more positioning measurement values to the LMF based on the positioning measurement report request message, wherein the one or more positioning measurement values comprises one or more carrier phase measurement values, wherein the carrier phase measurement values comprise:
phase measurement values of N subcarriers representing a positioning reference signal; or,
a phase measurement value of a first subcarrier among the N subcarriers representing the positioning reference signal and phase differences between the remaining subcarriers except the first subcarrier and the first subcarrier among the N subcarriers,
wherein N is a positive integer greater than or equal to 1.

2. The method of claim 1, wherein the N subcarriers are configured by any one of the following modes:
acquiring the N subcarriers predefined by a system;
receiving configuration information of the N subcarriers sent by the LMF; or
determining the N subcarriers and sending indication information of the N subcarriers to the LMF by the positioning measurement device.

3. The method of claim 1, wherein the first subcarrier is configured by any one of the following modes:
acquiring the first subcarrier predefined by a system;
receiving configuration information of the first subcarrier sent by the LMF; or
determining the first subcarrier and sending the indication information of the first subcarrier to the LMF by the positioning measurement device.

4. The method of claim 1, further comprising:
receiving expected value information of the carrier phase measurement values sent by the LMF, wherein the expected value information is used for indicating a value range of phase values of the subcarriers.

5. The method of claim 1, wherein each carrier phase measurement value is associated with an orthogonal frequency division multiplexing (OFDM) symbol index;
wherein the OFDM symbol index is configured by any one of the following modes:
acquiring the OFDM symbol index predefined by a system;
receiving configuration information of the OFDM symbol index sent by the LMF; or
determining the OFDM symbol index and sending indication information of the OFDM symbol index to the LMF by the positioning measurement device.

6. The method of claim 1, wherein the one or more carrier phase measurement values is reported in units of a carrier, wherein the carrier is a carrier in a carrier aggregation;
the one or more positioning measurement values further comprise one or more of the following items:
information on the location of the terminal, error report information, measurement identification information, a difference of a carrier phase, a measurement quality of difference of a carrier phase, a measurement quality of absolute measurement value of the carrier phase, a carrier phase change measurement value, a measurement quality of carrier phase change measurement value, a carrier phase change rate, a measurement quality of carrier phase change rate, a reception time measurement value, a measurement quality of the reception time measurement value, an angle measurement value, a measurement quality of the angle measurement value, a power measurement value, a measurement quality of power measurement value, a velocity measurement value, a measurement quality of the velocity measurement value, a Doppler measurement value, a measurement quality of the Doppler measurement value, carrier phase measurement results of a multicarrier, measurement qualities of carrier phase measurement results of the multicarrier, direction indication information, time information during measurements or information on transmission reception points (TRP) referred during measurements;
the velocity measurement value, the Doppler measurement value, and the direction indication information are obtained based on the carrier phase measurement values or the carrier phase change measurement value.

7. The method of claim 1, further comprising:
reporting measurement qualities corresponding to all carrier phase measurement values in the one or more carrier phase measurement values to the LMF; or,
reporting the measurement qualities corresponding to a part of the carrier phase measurement values in the one or more carrier phase measurement values to the LMF,
wherein one carrier phase measurement value corresponds to one measurement quality.

8. The method of claim 1, wherein in case that the positioning measurement device is a terminal, the positioning measurement report request message comprises one or more of the following information:
information for indicating whether to report an absolute value of a carrier phase;
information for indicating whether to report a difference of a carrier phase;
information for indicating whether to report a measurement value;
information for indicating whether assistance data are present;
information for indicating whether to report a multipath measurement value; or
reported configuration information;
wherein in case that the positioning measurement device is a base station, the positioning measurement report request message comprises one or more of the following information:
information of the measured terminal;
measurement identification information;
configuration information of a reference symbol for carrier phase positioning measurement sent by a terminal;
a measurement period;
type information of the measurement value; or
additional measurement information.

9. A measurement reporting method, performed by a location management function (LMF), comprising:
sending a positioning measurement report request message to a positioning measurement device; and
receiving one or more positioning measurement values reported by the positioning measurement device based on the positioning measurement report request message, wherein the one or more positioning measurement values comprises one or more carrier phase measurement values,
wherein the carrier phase measurement values comprise:
phase measurement values of N subcarriers representing a positioning reference signal; or,
a phase measurement value of a first subcarrier among the N subcarriers representing the positioning reference signal and phase differences between the remaining subcarriers except the first subcarrier and the first subcarrier among the N subcarriers,
wherein N is a positive integer greater than or equal to 1.

10. The method of claim 9, wherein the N subcarriers are configured by any one of the following modes:
acquiring the N subcarriers predefined by a system;
configuring the N subcarriers and sending configuration information of the N subcarriers to the positioning measurement device by the LMF; or receiving indication information of the N subcarriers sent by the positioning measurement device.

11. The method of claim 9, wherein the first subcarrier is configured by any one of the following modes:
acquiring the first subcarrier predefined by a system;
configuring the first subcarrier and sending configuration information of the first subcarrier to the positioning measurement device by the LMF; or
receiving indication information of the first subcarrier sent by the positioning measurement device.

12. The method of claim 9, further comprising:
sending expected value information of the carrier phase measurement value to the positioning measurement device, wherein the expected value information is used for indicating a value range of phase values of the subcarriers.

13. The method of claim 9, wherein each carrier phase measurement value is associated with an Orthogonal frequency division multiplexing (OFDM) symbol index;
wherein the OFDM symbol index is configured by any one of the following modes:
acquiring the OFDM symbol index predefined by a system;
configuring the OFDM symbol index and sending configuration information of the OFDM symbol index to the positioning measurement device by the LMF; or
receiving indication information of the OFDM symbol index sent by the positioning measurement device.

14. The method of claim 9, wherein the one or more carrier phase measurement values is reported in units of a carrier, wherein the carrier is a carrier in a carrier aggregation;
the one or more positioning measurement values further comprise one or more of the following items:
information on the location of the terminal, error report information, measurement identification information, a difference of a carrier phase, a measurement quality of difference of a carrier phase, a measurement quality of absolute measurement value of the carrier phase, a carrier phase change measurement value, a measurement quality of carrier phase change measurement value, a carrier phase change rate, a measurement quality of carrier phase change rate, a reception time measurement value, a measurement quality of the reception time measurement value, an angle measurement value, a measurement quality of the angle measurement value, a power measurement value, a measurement quality of power measurement value, a velocity measurement value, a measurement quality of the velocity measurement value, a Doppler measurement value, a measurement quality of the Doppler measurement value, carrier phase measurement results of a multicarrier, measurement qualities of carrier phase measurement results of the multicarrier, direction indication information, time information during measurements or information on transmission reception points (TRP) referred during measurements;
wherein the velocity measurement value, the Doppler measurement value, and the direction indication information are obtained based on the carrier phase measurement values or the carrier phase change measurement value.

15. The method of claim 9, further comprising:
receiving measurement quality corresponding to all carrier phase measurement values in the one or more carrier phase measurement values reported by the positioning measurement device; or,
receiving measurement quality corresponding to a part of carrier phase measurement values in the one or more carrier phase measurement values reported by the positioning measurement device,
wherein one carrier phase measurement value corresponds to one measurement quality.

16. The method of claim 9, wherein in case that the positioning measurement device is a terminal, the positioning measurement report request message comprises one or more of the following information:
information for indicating whether to report an absolute value of a carrier phase;
information for indicating whether to report a difference of a carrier phase;
information for indicating whether to report a measurement value;
information for indicating whether assistance data are present;
information for indicating whether to report a multipath measurement value; or
reported configuration information;
in case that the positioning measurement device is a base station, the positioning measurement report request message comprises one or more of the following information:
information of the measured terminal;
measurement identification information;
configuration information of a reference symbol for carrier phase positioning measurement sent by a terminal;
a measurement period;
type information of the measurement value; or
additional measurement information.

17. A location management function (LMF), comprising a memory storing a computer program, and a processor, wherein the computer program, when executed by the processor, causes the processor to perform the steps of claim 9.

18. A positioning measurement device, comprising a memory storing a computer program, and a processor, wherein the computer program, when executed by the processor, causes the processor to perform the following steps:
receiving a positioning measurement report request message sent by a location management function (LMF); and
reporting one or more positioning measurement values to the LMF based on the positioning measurement report request message, wherein the one or more positioning measurement values comprises one or more carrier phase measurement values,
wherein the carrier phase measurement values comprise:
phase measurement values of N subcarriers representing a positioning reference signal; or
a phase measurement value of a first subcarrier among the N subcarriers representing the positioning reference signal and phase differences between the remaining subcarriers except the first subcarrier and the first subcarrier among the N subcarriers,
wherein N is a positive integer greater than or equal to 1.

* * * * *